W. B. WEST.
MEANS FOR STARTING INTERNAL COMBUSTION ENGINES.
APPLICATION FILED JAN. 28, 1909.

937,127.

Patented Oct. 19, 1909.

2 SHEETS—SHEET 1.

Witnesses
W. A. Williams

Inventor
W. B. West.

By
Attorneys

W. B. WEST.
MEANS FOR STARTING INTERNAL COMBUSTION ENGINES.
APPLICATION FILED JAN. 28, 1909.
937,127.
Patented Oct. 19, 1909.
2 SHEETS—SHEET 2.
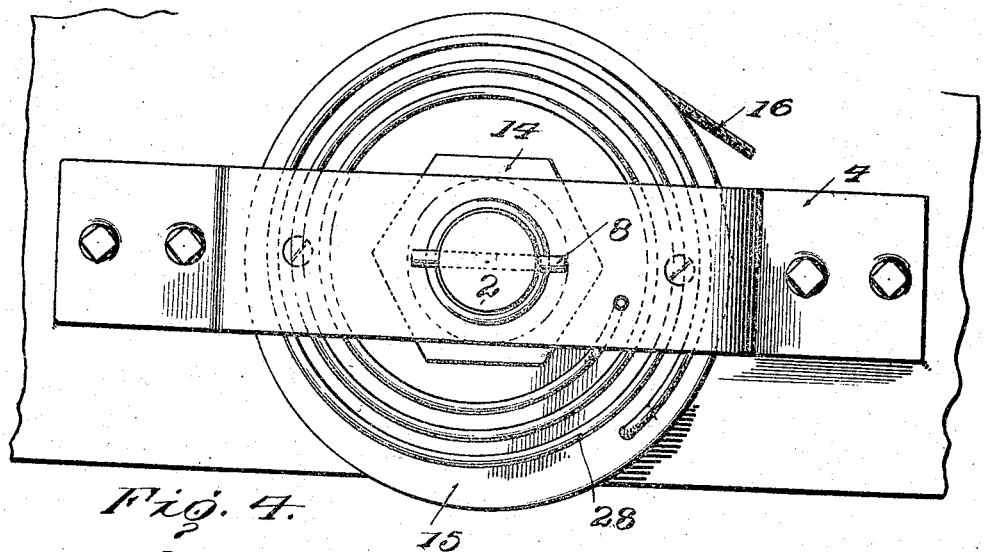
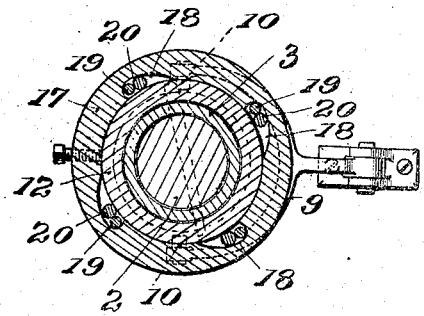
Witnesses
W. A. Williams
W. N. Woodson
Inventor
W. B. West
By W. A. Macey
Attorneys

UNITED STATES PATENT OFFICE.

WILLIAM B. WEST, OF COLUMBIA, MISSOURI.

MEANS FOR STARTING INTERNAL-COMBUSTION ENGINES.

937,127.

Specification of Letters Patent.    Patented Oct. 19, 1909.

Application filed January 28, 1909. Serial No. 474,760.

*To all whom it may concern:*

Be it known that I, WILLIAM B. WEST, citizen of the United States, residing at Columbia, in the county of Boone and State of Missouri, have invented certain new and useful Improvements in Means for Starting Internal-Combustion Engines, of which the following is a specification.

The present invention relates to an improved device for starting internal combustion engines such as are commonly employed in connection with automobiles, launches, and the like, and the object of the invention is the provision of a device of this character which is peculiarly designed and constructed so as to be readily manipulated from the usual station of the operator.

With an automobile the device has the advantage of enabling the operator to enter the car and be seated before starting the engine.

The invention further contemplates a device of this character which is simple and inexpensive in its construction, and which can be readily applied to an automobile or the like.

Figure 1:
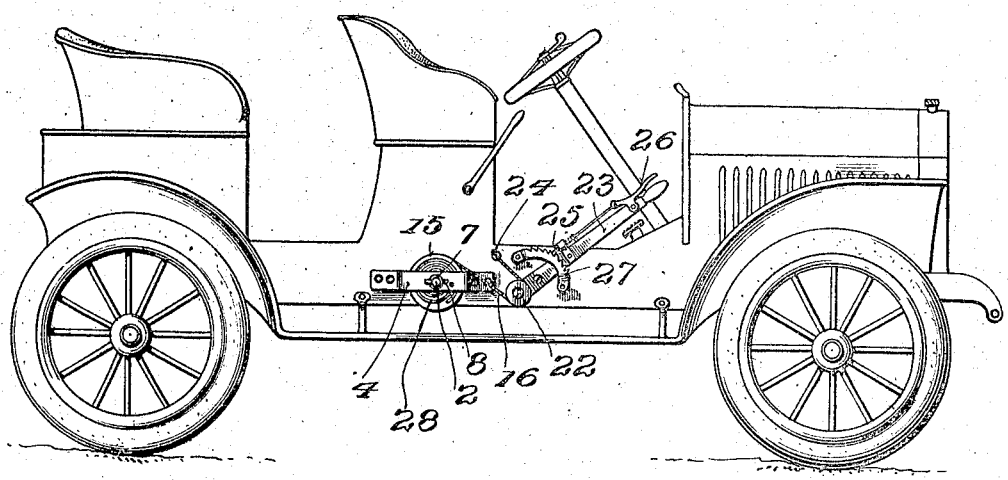
Figure 2:
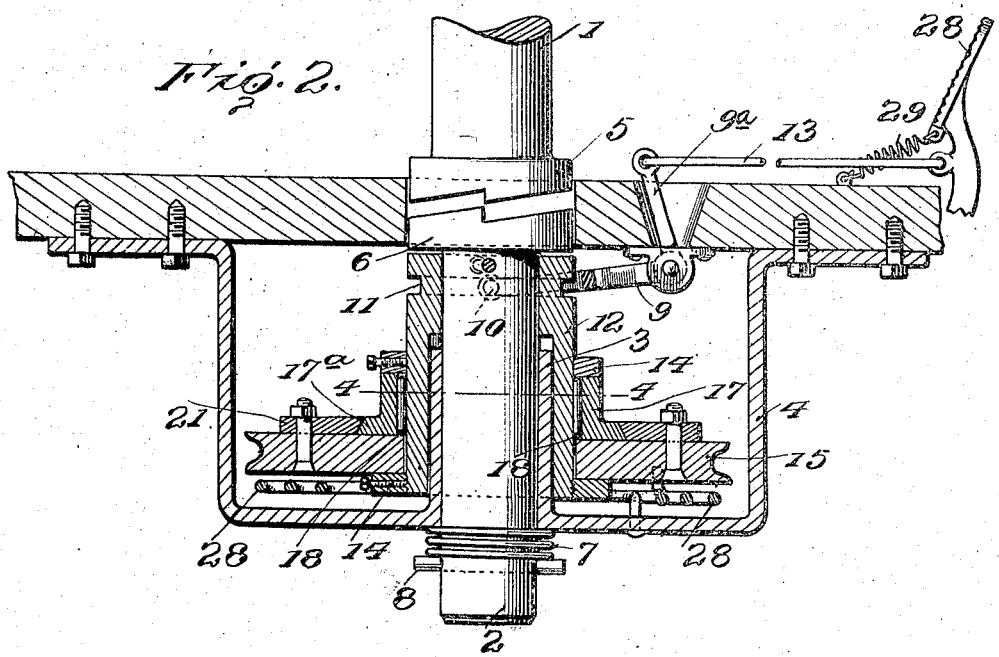

For a full understanding of the invention and the merits thereof and also to acquire a knowledge of the details of construction and the means for effecting the result, reference is to be had to the following description and accompanying drawings, in which:

Figure 1 is a side elevation of an automobile provided with an engine starting device constructed in accordance with the present invention; Fig. 2 is an enlarged horizontal sectional view through the wheel and clutch mechanism mounted upon the countershaft, portions of the engine shaft and automobile body being shown; Fig. 3 is a side elevation of the device, the hand lever being omitted; and, Fig. 4 is a transverse sectional view on the line 4—4 of Fig. 2.

Corresponding and like parts are referred to in the following description and indicated in all the views of the drawings by the same reference characters.

Specifically describing the embodiment of the invention shown in the first four figures of the drawings, the numeral 1 designates the engine shaft, and 2 a countershaft which is arranged in alinement with the engine shaft at one end thereof and is journaled in a tubular bearing 3 projecting inwardly from a bracket 4. A clutch member 5 is rigid with the engine shaft 1 and a coöperating clutch member 6 is rigid with the countershaft 2, the two clutch members being normally held out of engagement with each other by means of a spring 7 which surrounds the end of the countershaft 2 projecting beyond the bracket 4 and is interposed between the said bracket and a pin 8 which is passed transversely through the countershaft. For the purpose of throwing the clutch members into engagement with each other when starting the engine, a shifter lever 9 is employed, the end of the lever being bifurcated and the arms of the bifurcation being provided with pins 10 which are received loosely within an annular groove 11 in a sleeve 12 which is rigidly applied to the countershaft 2 and surrounds the tubular bearing 3. The pivot end of the shifter lever 9 is formed with a laterally projecting arm 9ª the extremity of which is connected by a link 13 to a suitable foot lever arranged convenient to the operator. It will thus be obvious that by placing the foot upon the foot lever and applying pressure thereto, the countershaft 2 can be moved longitudinally in its bearings against the action of the spring 7 and the clutch members 5 and 6 thrown into engagement with each other.

Loose upon the sleeve 12 between a pair of set collars 14 thereon, is a wheel 15 the periphery of which is grooved and has a cable 16 wound thereon, one of the extremities of the cable being secured to the wheel. A clutch member 17 is applied to one side of the wheel 15 and is in the form of a collar surrounding the sleeve 12, the interior of the collar being formed with a plurality of recesses 18 which are deeper at one end than at the opposite end and consequently have an inclined base. Arranged within each of these recesses are a small roller 19 and a large roller 20, the small roller being disposed between the large roller and the larger end of the recess. When the wheel 15 is turned in one direction the two rollers of each of the recesses are shifted into the larger end of the recess so as to turn freely and permit the wheel to rotate independently of the sleeve 12 and countershaft 2. On the other hand when the wheel is turned in the opposite direction the large rollers 20 are wedged between the sleeve 12 and the inclined bases of the recesses and the wheel are locked with the sleeve so that the wheel, the sleeve, and the countershaft must all be turned in unison. The edges of the clutch member 17 are beveled at 17ª and engaged by the beveled edge of a ring 21 which is bolted or otherwise permanently connected to the wheel.

The cable 16 after being wound upon the wheel passes around a second wheel or pulley 22 upon a lever 23 which is pivoted to the body of the automobile so as to be readily grasped by a person upon the seat, the extremity of the cable being secured to the body of the automobile as indicated at 24. A latch 25 which is controlled by the usual latch lever 26, is mounted upon the lever 23 and is designed to engage a rack 27 upon the automobile to lock the lever against movement.

When it is desired to start the engine the clutch members 5 and 6 are first thrown into engagement with each other by pressing upon the foot lever controlling the same, and the main lever 23 then drawn rearwardly by pulling upon the same with the hand. This movement of the main lever unwinds the cable 16 from the wheel 15 and turns the wheel in that direction in which it is locked with the countershaft by means of the roller clutch previously described. Both the countershaft and engine shaft are in this manner turned, and as soon as the main lever is again swung back to normal position, the wheel 15 is turned to wind up the cable by means of a spring 28, one end of the spring being secured to the wheel while the opposite end is secured to the bracket, and the spring being placed under tension when the lever is drawn rearwardly to start the engine. As the wheel thus turns to again wind up the cable the roller clutch mechanism is thrown out of operation and the wheel turns independently of the countershaft. Should it become necessary in order to start the engine, it will be entirely obvious that the operator could impart several successive pulls to the main lever, the wheel 15 turning independently of the countershaft when winding up the cable between the successive movements of the lever.

Having thus described the invention, what is claimed as new is:

In a starting device for internal combustion engines, the combination with the engine shaft, of a bracket formed with a tubular bearing, a countershaft journaled with the tubular bearing and arranged in alinement with the engine shaft, coöperating clutch members upon the engine shaft and countershaft, means for throwing the said clutch members into and out of engagement with each other, a clutch sleeve rigid with the countershaft and surrounding the tubular bearing, a wheel loose upon the clutch sleeve, a clutch member upon the wheel, a roller clutch device between the clutch member and the sleeve which admits of the wheel turning independently of the sleeve in one direction but locks the wheel with the sleeve when turned in the opposite direction, and means for turning the wheel in the said opposite direction to start the engine.

In testimony whereof I affix my signature in presence of two witnesses.

WILLIAM B. WEST. [L. S.]

Witnesses:
M. B. McDonnell,
A. E. West.